United States Patent
Fournier et al.

(10) Patent No.: US 9,527,569 B2
(45) Date of Patent: Dec. 27, 2016

(54) HYDROGEN-REGENERATING SOLAR-POWERED AIRCRAFT

(71) Applicant: SOLAR SHIP INC., Toronto (CA)

(72) Inventors: Sebastien Fournier, Toronto (CA); Jay Godsall, Toronto (CA)

(73) Assignee: Solar Ship Inc., Toronto (CA)

( * ) Notice: Subject to any disclaimer, the term of this patent is extended or adjusted under 35 U.S.C. 154(b) by 0 days.

(21) Appl. No.: 14/428,906

(22) PCT Filed: Sep. 19, 2013

(86) PCT No.: PCT/CA2013/000791
§ 371 (c)(1),
(2) Date: Mar. 17, 2015

(87) PCT Pub. No.: WO2014/043789
PCT Pub. Date: Mar. 27, 2014

(65) Prior Publication Data
US 2015/0246717 A1    Sep. 3, 2015

Related U.S. Application Data

(60) Provisional application No. 61/703,207, filed on Sep. 19, 2012.

(51) Int. Cl.
*B64B 1/24* (2006.01)
*C25B 15/08* (2006.01)
(Continued)

(52) U.S. Cl.
CPC ................. *B64B 1/24* (2013.01); *B60L 8/003* (2013.01); *B64B 1/02* (2013.01); *B64B 1/12* (2013.01);
(Continued)

(58) Field of Classification Search
CPC ..................................... B64B 1/24; B64B 1/58
See application file for complete search history.

(56) References Cited

U.S. PATENT DOCUMENTS 1,071,180 A * 8/1913 Remington ............... B64B 1/40
244/95
4,285,481 A    8/1981 Biscomb
(Continued)

FOREIGN PATENT DOCUMENTS

CN    1703580    11/2005
GB    2356184 B    8/2003
(Continued)

OTHER PUBLICATIONS

Khoury, G.A. "Airship Technology (2nd edition)." Cambridge Aerospace Series vol. 10. Cambridge University Press, 2012. Retrieved on Dec. 7, 2015 from <https://books.google.com/books?id=SiaejBco6NUC>. p. 16.*
(Continued)

*Primary Examiner* — Brian M O'Hara
*Assistant Examiner* — Michael Kreiner
(74) *Attorney, Agent, or Firm* — Faegre Baker Daniels LLP

(57) ABSTRACT

An aircraft comprising a hydrogen-containing envelope, a water-collection system for collecting water from the envelope, an electrolyzer to convert the water collected using the water-collection system into hydrogen, and a hydrogen-replenishment system for replenishing the envelope with hydrogen generated using the electrolyzer. In one embodiment, generated hydrogen is also supplied to a hydrogen-fuelled propulsion system for propulsion of the aircraft.

18 Claims, 2 Drawing Sheets

(51) Int. Cl.
   *C25B 1/04* (2006.01)
   *B60L 8/00* (2006.01)
   *B64B 1/12* (2006.01)
   *B64B 1/14* (2006.01)
   *B64D 37/30* (2006.01)
   *B64B 1/02* (2006.01)
   *B64B 1/30* (2006.01)
   *B64B 1/58* (2006.01)
   *B64D 27/24* (2006.01)
   *B64D 33/00* (2006.01)
   *B64D 39/00* (2006.01)

(52) U.S. Cl.
   CPC . *B64B 1/14* (2013.01); *B64B 1/30* (2013.01); *B64B 1/58* (2013.01); *B64D 27/24* (2013.01); *B64D 33/00* (2013.01); *B64D 37/30* (2013.01); *B64D 39/00* (2013.01); *C25B 1/04* (2013.01); *C25B 15/08* (2013.01); *B60L 2200/10* (2013.01); *B64B 2201/00* (2013.01); *B64D 2211/00* (2013.01); *B64F 2700/6211* (2013.01); *Y02E 60/366* (2013.01); *Y02E 70/10* (2013.01); *Y02P 20/134* (2015.11); *Y02T 10/7083* (2013.01); *Y02T 90/44* (2013.01)

(56) References Cited

U.S. PATENT DOCUMENTS

| | | | |
|---|---|---|---|
| 5,890,676 A | 4/1999 | Coleman et al. | |
| 6,315,242 B1* | 11/2001 | Eichstedt | B64B 1/02 244/125 |
| 6,425,552 B1 | 7/2002 | Lee et al. | |
| 6,841,893 B2* | 1/2005 | Maiwald | F03B 3/06 290/1 R |
| 7,137,592 B2* | 11/2006 | Barocela | B64B 1/06 244/123.11 |
| 7,249,733 B2* | 7/2007 | Palmer | B64B 1/02 244/30 |
| 7,306,187 B2* | 12/2007 | Lavan | B64B 1/14 244/123.11 |
| 8,247,912 B2 | 8/2012 | Da Costa Duarte Pardal et al. | |
| 8,372,506 B2* | 2/2013 | Vainshtein | A47B 97/00 137/312 |
| 2003/0207164 A1 | 11/2003 | McElroy et al. | |
| 2004/0104304 A1 | 6/2004 | Parmley | |
| 2006/0091256 A1 | 5/2006 | Palmer | |
| 2006/0261213 A1 | 11/2006 | Lavan | |
| 2007/0034741 A1 | 2/2007 | Fuller | |
| 2009/0065637 A1 | 3/2009 | Duncan et al. | |
| 2009/0206194 A1 | 8/2009 | Sinsabaugh | |
| 2009/0294576 A1 | 12/2009 | LaForge | |
| 2010/0270424 A1 | 10/2010 | DeLaurier | |
| 2011/0192938 A1 | 8/2011 | DiMarzio et al. | |
| 2012/0138733 A1* | 6/2012 | Hiebl | B64B 1/58 244/30 |
| 2013/0062457 A1* | 3/2013 | Deakin | B64B 1/08 244/25 |

FOREIGN PATENT DOCUMENTS

| | | |
|---|---|---|
| JP | 2002-255096 | 9/2002 |
| WO | 2007/139412 | 12/2007 |
| WO | 2011/117619 | 9/2011 |

OTHER PUBLICATIONS

Turner, Troy. "Collecting Water in the Sky." Retrieved from <http://www.yankodesign.com/2011/08/31/collecting-water-in-the-sky/>. Aug. 31, 2011.*

European Search Report dated Feb. 12, 2016 in corresponding EP Application No. 13838617.2.

Office Action issued Oct. 21, 2016 on corresponding Chinese patent application No. 201380058156.9, 8 pages.

Search Report issued Oct. 13, 2016 on corresponding Chinese patent application No. 201380058156.9, 3 pages.

* cited by examiner

Water flow: — · — · — · —
Hydrogen flow: · · · · · · · · · · ·
Electricity flow: — — — — — —

HYDROGEN-REGENERATING SOLAR-POWERED AIRCRAFT

The present application is a US national stage filing of PCT/CA2013/000791. The priority of which is hereby claimed and the disclosure thereof is hereby incorporated by reference.

TECHNICAL FIELD

The present technology relates generally to aerospace and aircraft and, in particular, to hybrid aircraft, and airships.

BACKGROUND

An aircraft, such as an airship, uses a lifting gas such helium or hydrogen to provide lift. A hybrid aircraft gains lift from both the lifting gas and an aerofoil-shaped wing that also provides aerodynamic lift. Solar hybrid aircraft use the large surface area on the envelope for collection of solar radiation for generating electric power to power electrically driven propellers.

With worldwide shortages of helium, however, there is renewed interest in the use of hydrogen as the buoyant gas.

Replenishment of the buoyant gas, due to leaks, conventionally requires access to a supply of the buoyant gas. This can be problematic when the aircraft is in remote locations or far from industrial centers having replenishment stations.

An improved hybrid aircraft design that addresses these issues would thus be highly desirable.

SUMMARY

In general, the present invention provides an aircraft, such as an airship, having a hydrogen-regenerating capability to regenerate and thus replenish hydrogen gas for the aircraft. Hydrogen regeneration is performed, in general, by collecting water from the surface of the aircraft (e.g. rain, dew, condensation, etc.) or from an onboard water tank and then converting this water into hydrogen using electrolysis. The hydrogen generated from this on-board electrolysis of water is used to replenish the gas-containing envelope to compensate for any hydrogen leakage from the envelope.

Thus, an aspect of the present invention is an aircraft comprising a hydrogen-containing envelope, an electrolyser to convert water into hydrogen, and a hydrogen-replenishment system for replenishing the hydrogen-containing envelope with hydrogen generated using the electrolyser. In one embodiment, the aircraft includes a water-collection system for collecting water from the hydrogen-containing envelope for supplying to the electrolyser.

Another aspect of the present invention is a hydrogen-fuelled aircraft comprising a hydrogen-containing envelope, an electrolyser to convert water into hydrogen, a hydrogen-replenishment system for replenishing the hydrogen-containing envelope with hydrogen generated using the electrolyser, and a hydrogen-fuelled propulsion system for propulsion of the aircraft. In one embodiment, the aircraft includes a water-collection system for collecting water from the hydrogen-containing envelope for supplying to the electrolyser.

Other aspects of the present invention are described below in relation to the accompanying drawings.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
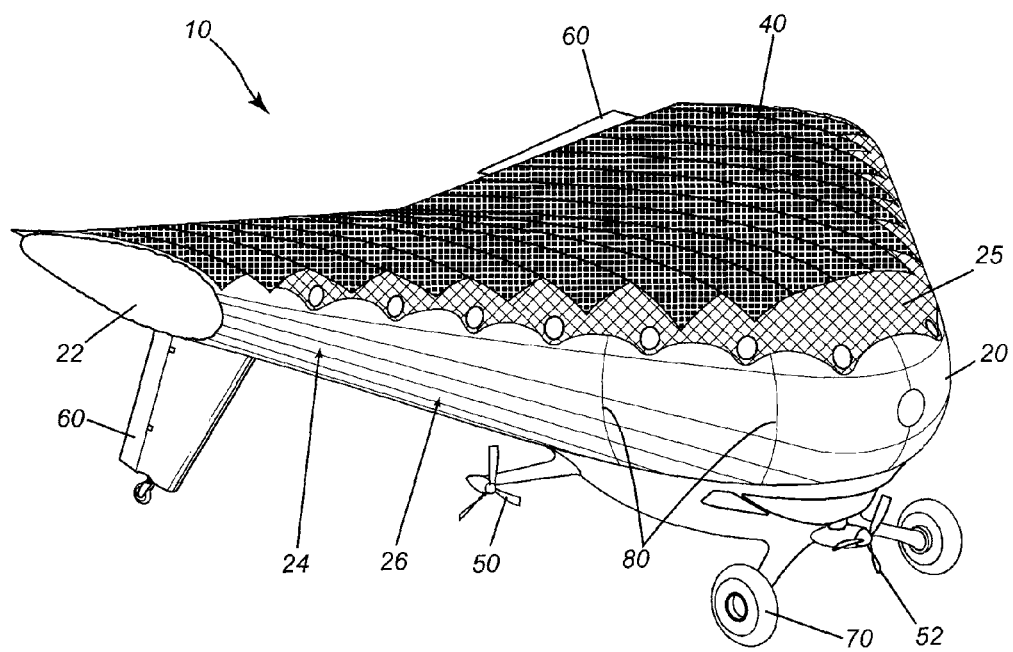
FIG. 1 is an isometric view of an aircraft in accordance with an embodiment of the present invention.
Figure 2:
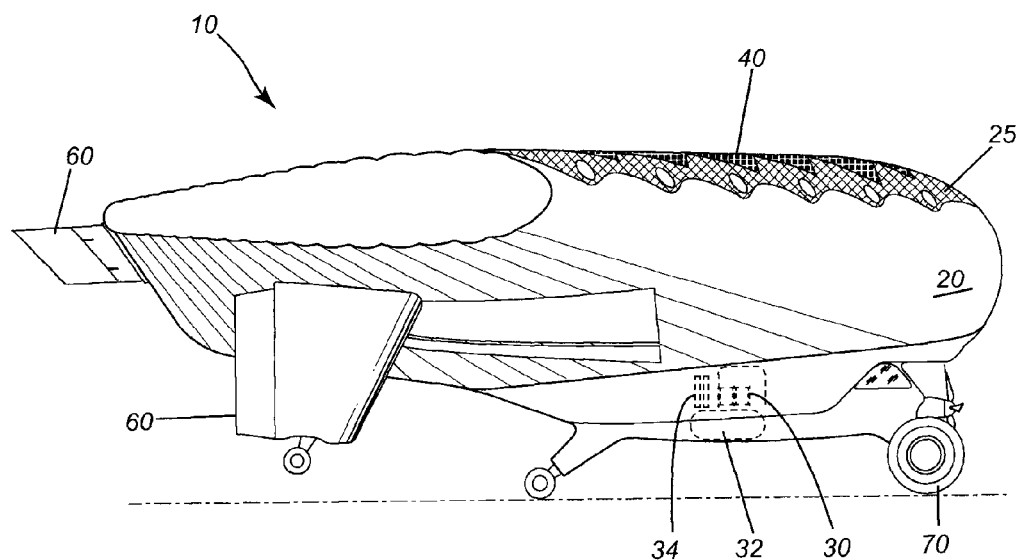
FIG. 2 is a side view of the aircraft illustrated in FIG. 1.

In the embodiment depicted in FIG. 1 and FIG. 2, an aircraft 10 comprises a hydrogen-containing envelope 20, an electrolyser 30 to convert water into hydrogen, and a hydrogen-replenishment system for replenishing the hydrogen-containing envelope with hydrogen generated using the electrolyser. In the particular embodiment, the aircraft is a hybrid aircraft. In the illustrated embodiment, the envelope of the hybrid aircraft contains hydrogen gas ($H_2$) as a buoyant gas for providing lift, or at least a portion of the lift in conjunction with aerodynamically-generated wing lift, to the hybrid aircraft.

As shown in the illustrated embodiment, the envelope 20 of the hybrid aircraft comprises a non-rigid wing-shaped inflatable structure 22. This wing-shaped inflatable structure comprises an aerofoil geometry to provide aerodynamic lift in addition to the buoyancy provided by the hydrogen gas inside the envelope. Inside the envelope are one or more hydrogen gas cells 24.

Solar radiation collecting elements (e.g. photovoltaic solar panels 40) collect solar radiation to generate electric power from the solar radiation. The solar panels 40 may be mounted on a solar panel attachment web 25 to the outer surface of the envelope or directly impregnated into the envelope. The solar energy is used to power electric motors such as the primary electric motors 50 and the auxiliary motor 52 shown in the figures. These motors drive propellers for providing the forward thrust. The solar-generated electric power may also be used to power control surfaces 60 such as a rudder, flaps, and/or ailerons. Solar-generated power may also be used to retract and deploy a retractable landing gear 70 although a fixed landing gear may be provided as shown in the illustrated embodiment. The electric power from the solar panels may also be used to power onboard electronics (e.g. communication gear, navigation equipment, anti-collision lights, onboard lighting, heating, cooling, ventilation, etc.). Excess electric power may be stored in batteries or ultra-capacitors onboard the aircraft. The electric power from the solar panels (or from the batteries or ultra-capacitors) is also used for electrolysis of water to generate hydrogen.

The water-collection system collects water from any number of sources including rain, dew and condensation (or even from melting snow). The water-collection system comprises water-collection channels 80 disposed within an outer surface of the envelope as illustrated by way of example in the figures. The water-collection system comprises a water reservoir and filtration bed for receiving the water from the water-collection channels. The reservoir is used to store water for hydrogen generation. The filtration bed filters the water to remove dirt, dust or debris so as to provide pure water to the electrolyser. The reservoir and filtration bed is collectively denoted by reference numeral 32.

The hydrogen-replenishment system comprises, in addition to the electrolyser, a hydrogen manifold 26 for supplying hydrogen to one or a plurality of hydrogen cells within the envelope. Deionizer columns 34 (or other deionization system such as ion exchange systems) may be provided as shown in the figures.

Hydrogen is thus generated from water collected by the aircraft. This on-board production of hydrogen enables automatic top-ups of hydrogen when required. When working in remote areas, relying on top-up infrastructures such as hydrogen tanks or refuelling stations is not realistic because the infrastructure is not always available and/or functioning. Therefore, having an on-board system generating the hydrogen needed as the lifting gas for regular top-ups or replenishment renders the aircraft fully self-reliant and self-sufficient.

Optionally, the aircraft may include a hydrogen pressure sensor for gauging, sensing or detecting the pressure of hydrogen in the inner envelope. This pressure sensor may provide a pressure signal to a microprocessor, microcontroller, computer, computing device, ASIC chip, or other control circuitry for the purposes of indicating, via a gauge, display, meter or readout, the hydrogen pressure in the inner envelope or, alternatively, a differential pressure between a desired operating pressure and the actual pressure of the hydrogen inside the envelope. This gauge or readout may be used to determine when to replenish the hydrogen. An alarm or alert may also be provided to the aircraft operator to signify that hydrogen pressure is low and that replenishment is required. Optionally, a control system may be used to automatically control valves in the hydrogen manifold to automatically replenish the hydrogen in the inner envelope when the control system receives a signal indicating that the pressure has fallen below a prescribed level.

In one specific embodiment, the envelope is a double hull having an inner and an outer envelope. Such an arrangement provides a fail-safe hydrogen containment system. With this double envelope design, the inner envelope contains the hydrogen (lifting gas) and the outer envelope contains the inert gas (nitrogen, helium, etc.). The ratio of the volumes of the inner and outer envelopes is selected such that any leak or failure of the inner envelope would not give rise to a hydrogen-to-air mixture greater than 4:100 on a volumetric basis. Moreover, the envelope is preferably made of a fabric that has a hydrogen leak rate not exceeding 2 L/m$^2$/day.

In another embodiment, the aircraft may have a water inlet or intake port for receiving a supply of water into the water reservoir. This enables water to be added manually to the water reservoir in cases when there is insufficient water being collected by the water-collection. In other words, if the amount of rain, dew, condensation, and/or snow is insufficient, the pilot of the aircraft or ground crew can simply add water to the water reservoir.

Figure 3:
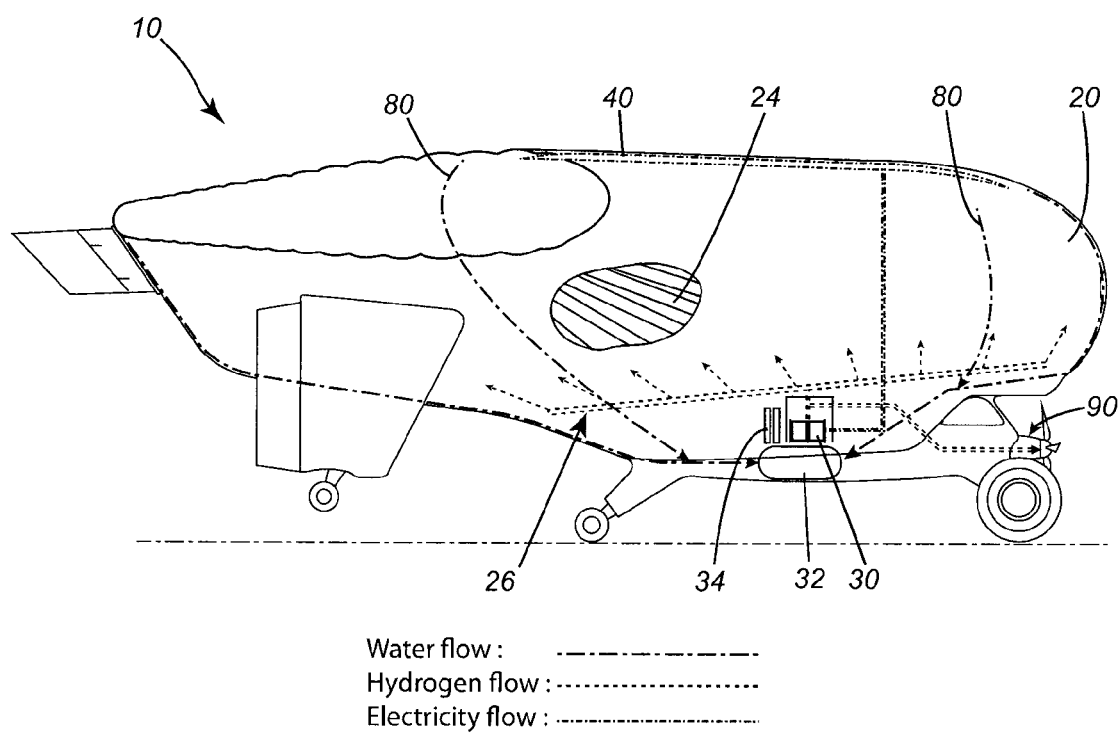
FIG. 3 is a side view of an all-hydrogen aircraft in accordance with another embodiment of the present invention.

In another embodiment, which is depicted by way of example in FIG. 3, the aircraft 10 may not only generate hydrogen to replenish the gas-containing envelope to compensate for leakage from the envelope but the aircraft may also generate hydrogen for fueling a hydrogen-based propulsion system 90 which may be a hydrogen fuel cell or a hydrogen-combustion engine. In one specific embodiment, hydrogen may be fed to a hydrogen fuel cell to generate electric power for driving one or more electric motors that rotate respective propeller(s). In another specific embodiment, hydrogen may be burned in a combustion engine.

In the fuel cell embodiment, the hydrogen may be used to generate electric power that is used to power onboard electronics (e.g. communication gear, navigation equipment, anti-collision lights, onboard lighting, heating, cooling, ventilation, etc.). Therefore, the aircraft may be an all-hydrogen aircraft in which water is converted to hydrogen and the hydrogen is used as a buoyant gas within the lifting envelope, as a fuel for propulsion, and a power source (via a fuel cell) for powering on-board electrical equipment (heating, ventilation, air conditioning, etc.) and on-board electronics (avionics, communications gear, navigation equipment, etc.)

Excess generated hydrogen may be stored in a hydrogen storage tank having a fuel line to the hydrogen-fuelled propulsion system. The hydrogen storage tank, which may store the hydrogen as a gas or cryogenically as a liquid, may be disposed within the fuselage of the aircraft.

FIG. 3 illustrates the water flow, hydrogen flow and electricity flow in one exemplary aircraft configuration. In the aircraft 10 depicted by way of example in FIG. 3, the solar panels 40 (or solar power array) mounted on the top surface of the envelope 20 generates electric power delivered by an electrically conductive wire or cable 41 to the electrolyser 30 to power onboard electrical or electronic equipment. FIG. 3 shows the water reservoir and filtration bed (collectively identified by reference numeral 32) and the deionizer columns 34. Water is delivered to the water reservoir and filtration bed 32 by the water-collection system 80, e.g. condensation collection channels disposed on the envelope 20. Inside the envelope 20 are hydrogen gas cells 24. Hydrogen generated by the electrolyser 30 is delivered into the hydrogen gas cells 24 via the hydrogen manifold 26. The hydrogen manifold 26 may also be configured to deliver hydrogen to the hydrogen propulsion system 90.

Although the figures illustrate a hybrid aircraft, it will be appreciated that the present invention may be applied or adapted to other types of aircraft. An aircraft, for the purposes of this specification, is thus meant to include an airship, air-based or airborne station, air vehicle, flying boat or other flying machine or apparatus that uses hydrogen as a lifting gas.

This new technology has been described in terms of specific implementations and configurations which are intended to be exemplary only. Persons of ordinary skill in the art will appreciate that many obvious variations, refinements and modifications may be made without departing from the inventive concepts presented in this application. The scope of the exclusive right sought by the Applicant(s) is therefore intended to be limited solely by the appended claims.

The invention claimed is:

1. An aircraft comprising:
   a hydrogen-containing envelope;
   an electrolyser to convert water into hydrogen;
   a hydrogen-replenishment system for replenishing the envelope with hydrogen generated using the electrolyser; and
   a water-collection system for collecting water as a liquid from the envelope and supplying the water to the electrolyser.

2. The aircraft of claim 1, wherein the envelope comprises a non-rigid wing-shaped inflatable structure.

3. The aircraft of claim 2, wherein the non-rigid wing-shaped inflatable structure comprises an aerofoil geometry to provide aerodynamic lift in addition to the buoyancy provided by the hydrogen gas inside the envelope.

4. The aircraft of claim 1, further comprising solar radiation collecting elements to collect solar radiation and to generate electric power from the solar radiation for supplying electric power to the electrolyser.

5. The aircraft of claim 1, wherein the water-collection system comprises water-collection channels disposed within an outer surface of the envelope.

6. The aircraft of claim 5, wherein the water-collection system comprises a water reservoir and filtration bed for receiving the water from the water-collection channels.

7. The aircraft of claim 1, wherein the hydrogen-replenishment system comprises a hydrogen manifold for supplying hydrogen to one or a plurality of hydrogen cells within the envelope.

8. The aircraft of claim 1, wherein the envelope comprises an inner envelope containing the hydrogen surrounded by an outer envelope containing an inert gas.

9. A hydrogen-fuelled aircraft comprising:
a hydrogen-containing envelope;
an electrolyser to convert water into hydrogen;
a hydrogen-replenishment system for replenishing the envelope with hydrogen generated using the electrolyser;
a hydrogen-fuelled propulsion system for propulsion of the aircraft; and
a water-collection system for collecting water in liquid form from the envelope for and supplying the water to the electrolyser.

10. The hydrogen-fuelled aircraft of claim 9, wherein the envelope comprises a non-rigid wing-shaped inflatable structure.

11. The hydrogen-fuelled aircraft of claim 10, wherein the non-rigid wing-shaped inflatable structure comprises an aerofoil geometry to provide aerodynamic lift in addition to the buoyancy provided by the hydrogen gas inside the envelope.

12. The hydrogen-fuelled aircraft of claim 9, further comprising solar radiation collecting elements to collect solar radiation and to generate electric power from the solar radiation for supplying electric power to the electrolyser.

13. The hydrogen-fuelled aircraft of claim 9, wherein the water-collection system comprises water-collection channels disposed within an outer surface of the envelope.

14. The hydrogen-fuelled aircraft of claim 13, wherein the water-collection system comprises a water reservoir and filtration bed for receiving the water from the water-collection channels.

15. The hydrogen-fuelled aircraft of claim 9, wherein the hydrogen-replenishment system comprises a hydrogen manifold for supplying hydrogen to one or a plurality of hydrogen cells within the envelope.

16. The hydrogen-fuelled aircraft of claim 9, wherein the envelope comprises an inner envelope containing the hydrogen surrounded by an outer envelope containing an inert gas.

17. The hydrogen-fuelled aircraft of claim 9 wherein the hydrogen-fuelled propulsion system comprises a hydrogen fuel cell.

18. The hydrogen-fuelled aircraft of claim 9, wherein the hydrogen-fuelled propulsion system comprises a hydrogen-combustion engine.

* * * * *